(12) United States Patent
Vernooij et al.

(10) Patent No.: US 6,345,091 B1
(45) Date of Patent: Feb. 5, 2002

(54) TELECOMMUNICATION SYSTEM AND METHOD FOR IMPLEMENTING AN ISDN PBX INTERFACE

(75) Inventors: Antonius Vernooij, Singapore (SG); Pekka Lampola, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/641,381

(22) Filed: Aug. 17, 2000

Related U.S. Application Data

(63) Continuation of application No. PCT/FI99/00123, filed on Feb. 16, 1999.

(30) Foreign Application Priority Data

Feb. 19, 1998 (FI) .................................................. 980382

(51) Int. Cl.[7] .............................................. H04M 7/00
(52) U.S. Cl. ................... 379/225; 379/220.01; 379/229; 379/230; 379/231
(58) Field of Search ............................... 379/225, 219, 379/220.01, 224, 229, 231, 234

(56) References Cited

U.S. PATENT DOCUMENTS

| | | | |
|---|---|---|---|
| 5,212,691 A | * 5/1993 | Hokari .................... | 379/230 X |
| 5,375,124 A | * 12/1994 | D'Ambrogio et al. .. | 379/284 X |
| 5,422,943 A | * 6/1995 | Cooney et al. ......... | 379/230 X |
| 5,550,834 A | * 8/1996 | D'Ambrogio et al. .. | 370/524 X |
| 5,805,690 A | * 9/1998 | Koepper et al. ........ | 379/219 X |
| 5,903,571 A | * 5/1999 | Koepper et al. | |
| 5,983,282 A | * 11/1999 | Yucebay | |
| 6,047,058 A | * 4/2000 | Wille ..................... | 379/216 X |

FOREIGN PATENT DOCUMENTS

| | | |
|---|---|---|
| EP | 0 583 137 | 2/1994 |
| EP | 0 590 863 | 4/1994 |
| EP | 0 707 432 | 4/1996 |
| JP | 3125551 | 5/1991 |

OTHER PUBLICATIONS

ETS 300 102–1, "Integrated Services Digital network (ISDN); User–network interface layer 3 Specifications for basic call control", *European Telecommunications Standards Institute*, Dec. 1990.

ETS 300 102–1 Amendment, "Integrated Services Digital network (ISDN); User–network interface layer 3 Specifications for basic call control", *European Telecommunications Standards Institute*, Apr. 1993.

ETS 300 403–1, Integrated Services Digital Network (ISDN); Digital Subscriber Signalling System No. one (DSS1) protocol; Signalling network layer for circuit–mode basic call control; Part 1: Protocol specification, *European Telecommunications Standards Institute*, Nov. 1995.

ETS 300 403–1 Corrigendum, Integrated Services Digital Network (ISDN); Digital Subscriber Signalling System No. one (DSS1) protocol; Signalling network layer for circuit –mode basic call control; Part 1: Protocol specification, *European Telecommunications Standards Institute*, Jun. 1996.

Ericsson Telecom AB, Telia AB, Studentlitteratur AB, "Understanding Telecommunications 2", pp. 223–225 (1998).

* cited by examiner

*Primary Examiner*—Creighton Smith
(74) *Attorney, Agent, or Firm*—Altera Law Group, LLC

(57) ABSTRACT

An ISDN telecommunication system and a method for implementing a private branch exchange interface. The system comprises an ISDN exchange (1), a primary rate interface (2), a PBX interface (3) and an ISDN PBX (4) provided with a multi-channelling device (6) for dividing the primary rate interface (2) into at least two PBX interfaces (3, 3'). In the invention, a B channel in the primary rate interface is converted into a D channel, which is used in the PBX interface (3, 3'). On the other hand, the information in the D channel of the primary rate interface (2) can be used and is distributed between the PBX interfaces (3, 3').

11 Claims, 1 Drawing Sheet

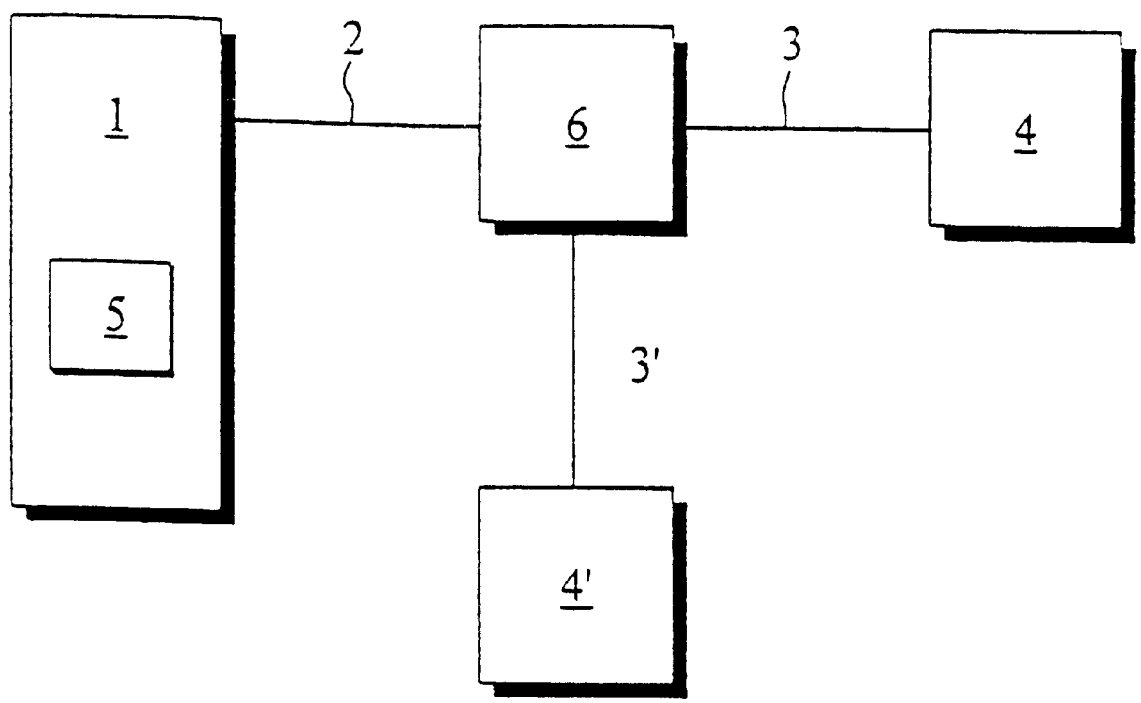

TELECOMMUNICATION SYSTEM AND METHOD FOR IMPLEMENTING AN ISDN PBX INTERFACE

This application is a cont of Ser. No. PCT/FI99/00123 filed Feb. 16, 1999.

The present invention relates to an ISDN telecommunication system as defined in the preamble of claim 1 and a method for implementing an ISDN PBX interface as defined in the preamble of claim 8.

In the ISDN system (ISDN, Integrated Services Digital Network), two access types have been defined: base access (BA) and primary rate access (PRA). Via a base access, it is possible to connect to the public telephone network an individual terminal device or a set of max. 8 terminal devices, two of which may be active at the same time. The channel structure of a base access is 2B+D, where B is 64 kbit/s information channel and D is a 16 kbit/s signalling channel. In a primary rate access, the corresponding structure is 30B+D, where D is a 64 kbit/s signalling channel.

The primary race access is designed to connect an ISDN PBX (Private Branch Exchange), which typically is a private branch exchange used by a company or other association, to a telephone exchange. If not all of the thirty access lines in the ISDN PBX are needed, then the extra channels in the primary rate access remain unused. Still, the user of the ISDN PBX must bear the full cost of a 30B+D-type primary rate access. A known solution is to have a plurality of 2B+D base access lines connected to the ISDN PBX. In this case, instead of a single 2048 kbit/s primary rate access PCM cable (PCM, Pulse Code Modulation), a plurality of cables and extra equipment are needed and not all of the services associated with a primary rate access are available to the user.

The object of the present invention is to eliminate the drawbacks described above. A specific object of the present invention is to disclose a new type of system in an ISDN network, designed to enable a plurality of branch exchange interfaces to be connected to a single primary rate interface.

As for the features characteristic of the invention, reference is made to the claims.

The invention concerns a telecommunication system which comprises a telephone exchange provided with ISDN properties, including an information channel B and a signalling channel D. Connected to the telephone exchange is a primary rate interface. An ISDN PBX is connected to the telephone exchange via a PBX interface similar to a primary rate interface. The system of the invention comprises means for dividing a primary rate interface into at least two PBX interfaces.

In a preferred embodiment of the invention, the system comprises means for converting a B channel in the primary rate interface into a D channel, thus changing the 30B+D type primary rate interface into a (31−n)B+(n*D) type interface, n being an integer greater than zero.

In a preferred embodiment of the invention, the system comprises a multi-channelling device connected to the primary rate interface and to the PBX interface. The system preferably comprises means for removing the D channel converted from a B channel into time slot no. 16 of the PBX interface.

In a preferred embodiment of the invention, the system comprises means for distributing the messages transmitted in the D channel of the primary rate interface into corresponding D channels in the PBX interface on the basis of the information (e.g. Channel identification and Call reference) carried by the messages.

In the method of the invention, the primary rate interface is divided into at least two PBX interfaces. In an embodiment of the method, one of the B channels in the primary rate interface is converted into a D channel, the converted D channel being preferably transmitted in time slot no. 16 of the PBX interface. The B channel is preferably transmitted in the same channel in both the PBX interface and the primary rate interface.

In an embodiment of the method of the invention, the information transmitted in the D channel of the primary rate interface is distributed into the D channels of the PBX interfaces.

As compared with prior art, the invention has the advantage that it provides an ISDN PBX interface with a lower capacity and at lower costs than a primary rate interface for small companies and equivalent associations. The exchange can be connected via a single PCM cable to means dividing a primary rate interface, said means being further connected via cables to two or more separate PBX interfaces. Thus, the costs of a primary rate interface can be distributed among several users, who still receive the subscriber services provided by a primary rate interface. From the operator's point of view, the invention allows separate billing of each user.

In the following, the invention will be described by the aid of a few examples of its embodiments by referring to the attached drawing, which presents a diagram representing a system according to the invention.

FIG. 1 shows an ISDN exchange 1, which is connected via a primary rate interface 2 to a multi-channelling device 6. ISDN private branch exchanges 4 and 4' are connected to the multi-channelling device 6 via PBX interfaces 3 and 3'.

The primary rate interface 2 is implemented using a PCM cable with a data transmission capacity of 2048 kbit/s according to the European standard and a 30B+D channel structure as presented in the ETSI (European Telecommunications and Standards Institute) publication series ETS 300 403 and ETS 300 102. The corresponding North-American primary rate interface has a 23B+D channel structure. In the primary rate interface, both B and D channels have a data transmission capacity of 64 kbit/s.

The primary rate interface 2 is divided between two or more PBX interfaces so that each one of the PBX interfaces has a separate D channel carrying only the signalling of the particular PBX interface in standard time slot no. 16. The division is effected in the multi-channelling device 6.

The PBX interface is implemented using a PCM cable and it is divided into time slots corresponding to the primary rate interface. In the PBX interface, a B channel is in the same time slot as in the primary rate interface, and no time slots reserved for other PBX interfaces are used. Unused time slots are defined as being in a "Not working" state.

In the ISDN exchange 1, the channels are distributed in the primary rate interface in the form of (31−n)B+(n*D), where n is an integer greater than zero. If n=1, then the channel structure is 30B+D, in other words, with respect to the ISDN exchange, the situation is as defined by the standard. The division into PBX interfaces 3 and 3' as provided by the invention is effected in the multi-channelling device 6, which is capable of distributing the messages carried by the D channel of the primary rate interface 2 into corresponding PBX interface D channels on the basis of the information (Channel identification and Call reference) transmitted within the messages. Thus, the channel structure of the PBX interfaces 3 and 3' may be e.g. as follows:

PBX interface 3: 15B+D, time slots no. 1–15 for the B channels, time slot 16 for the D channel, PBX interface 3': 15B+D, time slots no. 17–31 for the B channels, time slot 16 for the D channel.

In a situation where n>1, e.g. n=3, the channel structure of the primary rate interface 2 is 28B+3D. The ISDN exchange contains means 5 for converting a B channel into a D channel. The converted D channel is transmitted in one of the B channel time slots no. 1–15 or 17–31 of the PCM cable, in other words, in one of the B channels 1–30 of the ISDN interface. It is to be noted that the time slot reserved for the converted D channel remains unused in the PBX interface 3. The converted D channel is transferred by the multi-channelling device 6 into time slot no. 16 of the PBX interface 3, so the ISDN private branch exchange 4 will see the D channel correctly. In this case, the multi-channelling device only performs a rearrangement of channels and is not required to carry out any intelligent functions as in the case of n=1. Thus, the channel structure in PBX interfaces 3, 3', 3" (not shown in FIG. 1) may be e.g. as follows:

PBX interface 3: 10B+D, time slots no. 1–10 for the B channels, time slot 16 for the D channel, PBX interface 3': 9B+D, time slots no. 11–15, 17–20 for the B channels, time slot 16 for the D channel, PBX interface 3": 9B+D, time slots no. 21–29 for the B channels, time slot 16 for the D channel, time slot no. 16 in the primary rate interface being configured as D channel for interface 3 and time slots no. 30 and 31 as D channels for interfaces 3' and 3".

To sum up, let it be further stated that the system and method of the invention implement division of a single primary rate interface among two or more ISDN private branch exchanges, allowing ISDN private branch exchanges, preferably located close to each other but at a long distance from an ISDN exchange, to be established at a cost lower than the cost for two separate primary rate interfaces.

The invention is not restricted to the examples of its embodiments described above, but many variations are possible within the scope of the inventive idea defined by the claims.

What is claimed is:

1. Telecommunication system comprising a telephone exchange (1) provided with ISDN properties, including an information channel B and a signalling channel D, a primary rate interface (2) connected to the telephone exchange (1), a private branch exchange interface (3) communicating with the telephone exchange (1), and an ISDN private branch exchange (4) connected to the telephone exchange via the PBX interface, characterised in that the system comprises means (6) for dividing the primary rate interface (2) into at least two PBX interfaces (3, 3').

2. System as defined in claim 1, characterised in that the system comprises means for converting a B channel in the primary rate interface (2) into a D channel.

3. System as defined in claim 1, characterised in that the means (6) for dividing the primary rate interface are implemented in a multi-channelling device.

4. System as defined in claim 1, characterised in that, in the system, the B channel is in the same time slot in the PBX interface (3) and in the primary rate interface (2).

5. System as defined in claim 1, characterised in that the system comprises means for removing the D channel converted from a B channel of the primary rate interface (2) into time slot no. 16 of the PBX interface (3).

6. System as defined in claim 1, characterised in that the system comprises means (6) for distributing the messages transmitted in the D channel of the primary rate interface (2) into the D channels in the PBX interfaces (3, 3').

7. Method for implementing a private branch exchange interface in a telecommunication system comprising a telephone exchange (1) provided with ISDN properties, including an information channel B and a signalling channel D, a private branch exchange interface (3) communicating with the telephone exchange (1), and an ISDN private branch exchange (4) connected to the telephone exchange (1) via the PBX interface (3), characterised in that the primary rate interface (2) is divided into at least two PBX interfaces (3, 3').

8. Method as defined in claim 7, characterised in that one of the B channels in the primary rate interface (2) is converted into a D channel.

9. Method as defined in claim 7, characterised in that the B channel is transmitted in the same time slot in the PBX interface (3) and in the primary rate interface (2).

10. Method as defined in claim 7, characterised in that the D channel converted from a B channel of the primary rate interface (2) is transmitted in time slot no. 16 of the PBX interface (3).

11. Method as defined in claim 7, characterised in that the information in the D channel of the primary rate interface (2) is distributed into the D channels of the PBX interfaces (3, 3').

* * * * *